(12) United States Patent
Franovici

(10) Patent No.: US 8,156,407 B2
(45) Date of Patent: Apr. 10, 2012

(54) METHOD AND SYSTEM FOR MEMORY MANAGEMENT IN A HARQ COMMUNICATIONS SYSTEM

(75) Inventor: Bogdan Franovici, Bucharest (RO)

(73) Assignee: Sequans Communications, Puteaux (FR)

( * ) Notice: Subject to any disclaimer, the term of this patent is extended or adjusted under 35 U.S.C. 154(b) by 641 days.

(21) Appl. No.: 12/391,058

(22) Filed: Feb. 23, 2009

(65) Prior Publication Data

US 2009/0228755 A1 Sep. 10, 2009

(30) Foreign Application Priority Data

Feb. 22, 2008 (EP) ..................................... 08101913

(51) Int. Cl.
*G06F 11/00* (2006.01)
(52) U.S. Cl. ....................................................... 714/776
(58) Field of Classification Search .................. 714/748, 714/749, 751–754, 776, 786, 788, 790, 821
See application file for complete search history.

(56) References Cited

U.S. PATENT DOCUMENTS

| | | | |
|---|---|---|---|
| 7,797,605 B2 * | 9/2010 | Garrett et al. ................. | 714/748 |
| 7,813,361 B2 * | 10/2010 | Lee et al. ...................... | 370/412 |
| 8,060,801 B2 * | 11/2011 | Seol et al. ..................... | 714/748 |
| 2005/0138530 A1 | 6/2005 | Huang et al. | |
| 2006/0092960 A1 * | 5/2006 | Lee et al. ....................... | 370/412 |
| 2007/0263739 A1 * | 11/2007 | Garrett et al. ................. | 375/260 |
| 2008/0065944 A1 * | 3/2008 | Seol et al. ..................... | 714/748 |

FOREIGN PATENT DOCUMENTS

| | | |
|---|---|---|
| EP | 1389847 A1 | 2/2004 |
| WO | 2005125226 A2 | 12/2005 |
| WO | 2006035114 A1 | 4/2006 |

OTHER PUBLICATIONS

European Search Report for corresponding European Application No. 08101913.5 filed Feb. 22, 2008.

* cited by examiner

*Primary Examiner* — Nadeem Iqbal
(74) *Attorney, Agent, or Firm* — Westman, Champlin & Kelly, P.A.

(57) ABSTRACT

A method is provided for memory management in a communications system using a HARQ error control mechanism, in which a transmitter establishes a plurality of HARQ channels with a receiver. The method includes determining whether each received encoded HARQ packet needs to be combined with an encoded HARQ packet already stored in HARQ memory. In case a received encoded HARQ packet does not need to be combined, the method determines whether there is a free memory space available in the HARQ memory for storing that received encoded HARQ packet, and if so, allocating that free memory space for storage of that received encoded HARQ packet. If not, the method determines whether a certain amount of memory space can be forced to be freed, and if so, de-allocates it and then allocates it for storage of that received encoded HARQ packet, that packet is sent to an FEC decoder.

15 Claims, 7 Drawing Sheets

|   | A | B | C |
|---|---|---|---|
| H1 | 11 [X] | 12 [X] | 13 [X] |
| H2 | 14 [A\|B\|C\|D] | 15 [A\|B\|C\|D] | 16 [A\|B] |
| H3 31 | [A\|B] | [A\|B] | [A\|B] |
| H3 32 | [A\|C] | [C] | [A\|B] |
| H3 33 | [B\|D] | [D] | [A\|B] |
| H3 34 | [C\|D] | [A\|B] | [A\|B] |
| H4 41 | [A1\|B1] | [A1\|B1] | [A1\|B1] |
| H4 42 | [A2\|C2] | [C2] | [A2\|B2] |
| H4 43 | [B3\|D3] | [D3] | [A3\|B3] |
| H4 44 | [C4\|D4] | [A4\|B4] | [A4\|B4] |
| H5 51 | [A1\|B1\|0\|0] | [A1\|B1\|0\|0] | [A1\|B1] |
| H5 52 | [A2\|0\|C2\|0] | [0\|0\|C2\|0] | [A2\|B2] |
| H5 53 | [0\|B3\|0\|D3] | [0\|0\|0\|D3] | [A3\|B3] |
| H5 54 | [0\|0\|C4\|D4] | [A4\|B4\|0\|0] | [A4\|B4] |
| H6 61 | [A1\|B1\|0\|0] | [A1\|B1\|0\|0] | [A1\|B1] |
| H6 62 | [A1+A2\|B1\|C2\|0] | [A1\|B1\|C2\|0] | [A1+A2\|B1+B2] |
| H6 63 | [A1+A2\|B1+B3\|C2\|D3] | [A1\|B1\|C2\|D3] | [A1+..+A3\|B1+..+B3] |
| H6 64 | [A1+A2\|B1+B3\|C2+C4\|D3+D4] | [A1+A4\|B1+B4\|C2\|D3] | [A1+..+A4\|B1+..+B4] |
| H7 71 | [X1] | [X1] | [X1] |
| H7 72 | [X2] | [X2] | [X2] |
| H7 73 | [X3] | [X3] | [X3] |
| H7 74 | [X] | [X] | [X] |

Figure 4

METHOD AND SYSTEM FOR MEMORY MANAGEMENT IN A HARQ COMMUNICATIONS SYSTEM

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates generally to the field of packet data communication systems using hybrid automatic repeat request (HARQ) error detection and correction mechanisms and more particularly to a method for memory management in a receiver system thereof.

BACKGROUND OF THE DISCLOSURE

HARQ is a known communication protocol used in packet data communication systems for improving transmission reliability. HARQ combines forward error correction (FEC) and automatic repeat request (ARQ) techniques. In ARQ, a transmitter sends a plurality of data packets through a communications channel to a receiver, and adds, at least, an error detection information (such as a redundancy indication, e.g. CRC) to each of said sent data packets; and the receiver is then able to check if any of said transmitted packets contains transmission errors and, in case any of said received data packets contains any error due to a transmission through a poor quality transmission channel, discard said data packet and request its retransmission to the transmitter, as long as the errors occur. In some ARQ protocol implementations, the transmitter also provides identification information for each data packet sent (such as the sequence number) so that the receiver can request the retransmission of a specific packet which contains transmission errors. Examples of ARQ communication protocols schemes are stop-and-wait, go-back-N and selective repeat. FEC techniques (such as reed-solomon code or turbo code) rely on adding some error correction information to each transmitted packet which allows the receiver to detect and correct errors, to some extent, caused in the process of transmission.

There are various commonly known types of HARQ protocols: in type I HARQ the receiver discards received packets which contain transmission errors at the output of the FEC decoder and asks for retransmission of those packets. In Chase combining (CC) HARQ, the receiver stores in a memory received data packets which contain transmission errors at the output of the FEC decoder, asks for retransmission of those packets and when said packets are received again they are combined with the version of said packets previously stored in memory before providing to the FEC decoder. Combining the two received versions of the packet increases the probability of successful FEC decoding. The retransmitted data packets contain exactly the same set of coded bits as used for the initial transmission of said data packet. In incremental redundancy (IR) HARQ, additional redundant information is transmitted in each retransmission of the packet and the receiver, i.e. a retransmitted data packet may contain different coded bits as the ones used for the initial transmission of the data packet. At the receiver, the received data packets are decoded when they are received for the first time, and if unsuccessful, for each retransmission the newly received data packet will add combining gain and/or extra redundancy to the previous version stored in memory before providing to the FEC decoder. IR HARQ may use self-decodable or non self-decodable (at least in part) retransmission packets.

Due to HARQ schemes (e.g. CC and IR) which employ combining (e.g. soft-combining or code-combining) of received (retransmitted) packets with combining information of earlier non-successfully decoded versions of said packets before providing the combined packet to the FEC decoder, the dimensioning of the buffer to store HARQ data from failed decoding attempts becomes an important system architecture design issue, particularly in applications in which a transmitter establishes multiple parallel HARQ channel connections with a certain receiver, e.g. N-channel stop-and-wait HARQ. Said memory becomes quite large as the required sustainable data rates increase due to higher data rate demands of the consumer and this directly translates into a large amount of on-chip and/or off-chip memory. Using on-chip memory is expensive in terms of gate-count and using off-chip memory increases power consumption in the receiver system since large blocks of soft bits will have to be transferred from the memory, combined with the received data and stored back in the memory. Both, the size of the memory and mobile device power consumption, are particularly important in mobile wireless communications, where the HARQ protocol is widely used.

In order to reduce the memory size, there are known HARQ systems that dimension the HARQ receiver memory with a capacity below the worst case scenario (all received HARQ data are not successfully decoded and shall be maintained in memory for combining purposes) and which accept a certain amount of HARQ data loss.

U.S. Pat. No. 6,700,867 for example, discloses a HARQ communication system in which a HARQ receiver system contains a buffer with a certain predetermined space for storing received HARQ packets (received packets which have not been previously allocated in memory) and another for storing non-HARQ packets (received packets for which there is already related memory stored in the buffer). When any of said HARQ or non-HARQ packets are decoded successfully (FEC decoding) the corresponding allocated buffer space is freed and when any of said HARQ or non-HARQ packets are unsuccessfully decoded (FEC decoding), they are maintained in the buffer memory. The buffer memory space is dimensioned for a certain operating point (below the worst case) or percent of estimated received packets (HARQ or non-HARQ packets) which shall be maintained in the buffer after unsuccessful FEC decoding. When the number of unsuccessfully decoded packets increases over the estimated operating point, i.e. the buffer is full, there is not enough memory available for either storing received non-HARQ packets (before FEC decoding) or unsuccessfully decoded non-HARQ packets (after FEC decoding) and this information shall be discarded until some memory data is freed. To free memory, the HARQ receiver system relies on sending a request to a HARQ transmitter so that all packets to be transmitted (after said request) are self-decodable and therefore the probability of successful FEC decoding of received packets, which have memory allocated, increases and thus said memory can be freed. This solution though works only in HARQ receiver systems in which the transmitter and the receiver work in coordination and is thus not applicable to all HARQ systems, e.g. in which the HARQ transmitter is not adapted to react to a self-decode request from the HARQ receiver. Additionally, even if the transmitter reacts to the self-decode request message sent by the HARQ receiver, the solution does not avoid discarding valuable received or unsuccessfully decoded non-HARQ data packets. Another drawback of the above solution is that it can be only applied to incremental redundancy HARQ where at least part of the retransmissions are non self-decodable, since for Chase combining HARQ or for incremental redundancy HARQ where all the transmissions are self-decodable, it becomes useless.

PCT patent application WO 2004/062184 discloses a HARQ memory management method which does not depend on the coding type of data sent by the transmitter to free memory from the receiver buffer. The method describes providing the HARQ receiver system with a first buffer for storing received data blocks and a second buffer for storing information of unsuccessfully decoded data blocks, and when a data block is unsuccessfully decoded (e.g. FEC decoding) and there is not enough memory to store said data block in said second buffer for storing information of unsuccessfully decoded data blocks, freeing memory space from said second buffer based on characteristic parameters of already stored data blocks such as the data block sequence number or a quality indication. Although not explicitly indicated, the use of a receive buffer (the first buffer) is implicit, since the packet is first sent to the FEC decoder and then, if the decoding is unsuccessful, the packet will be stored, and therefore, meanwhile the packet needs to be stored somewhere due to the FEC decoder latency. This solution still wastes memory space for storing HARQ data blocks and presents a low data block-processing throughput due to latencies introduced in the data processing chain. Furthermore, if the decoding of the newly received packet was unsuccessful, it is then combined, and the combined packet is sent again to the FEC decoder, thus doubling the necessary cycles for decoding a packet.

SUMMARY

An aspect of the present disclosure relates to an improved method and system for memory management in a HARQ receiving system. This is achieved by the features of the independent claims, for example.

An exemplary aspect of the disclosure optimizes the amount of memory needed in a receiver system employing a HARQ error correction mechanism by improving memory reuse, and, as a consequence, reduce power consumption. The memory management method and system according to an illustrative example presents an overall improved performance in terms of data processing throughput in systems with high transmission data rate.

The method and system for memory management according to an example of the present disclosure avoids the set up and management of two different buffers, or two different memory sections in the same buffer, associated to different types of HARQ data, e.g. one buffer or section intended for received HARQ packets (before FEC decoding) and another buffer or section intended for HARQ packets that have not been decoded successfully (HARQ data that is stored in memory after FEC decoding for combining purposes). Advantageously, the method and system for memory management according to an example of the present disclosure allows the management of a single memory storage intended for comprising both a) received HARQ packets and b) said received HARQ packets or combined HARQ packets which have not been successfully decoded. The method therefore avoids wasting processing time for the exchange of HARQ information between two memories or memory sections either before or after FEC decoding.

An example of the present disclosure deals with the successful allocation of memory space for received HARQ packets before FEC decoding, thus avoiding delays which may be introduced by the FEC decoding process. According to an example of the present disclosure, when the memory is full, some memory space will be forced to be freed before the HARQ packet or a combination of HARQ packets is provided for FEC decoding. Since, according to an illustrative example, no allocation of memory space is needed after FEC decoding, there is no need to wait for the FEC decoder status for starting the allocation of a certain HARQ packet in memory. Any latency introduced by the FEC decoder is thereby advantageously prevented.

The present disclosure can be applied to all types of HARQ, regardless of the retransmission protocol used: selective repeat, go back N, multi-channel stop and wait, etc.

It shall be noted that although the term HARQ packet has been applied in a general meaning in the above paragraphs, it shall be understood that said term may also refer to a HARQ burst or to an encoded HARQ packet, as will become apparent particularly from the description of FIGS. 1 to 4. As a way of introducing such terms, hereunder, the term HARQ burst shall be understood as a data block which is sent from a transmitter system to a receiver system under HARQ protocol control and which comprises a subset of an encoded HARQ packet to be decoded by an FEC decoder; and the term encoded HARQ packet shall be understood as a HARQ packet converted by the transmitter to an encoded packet format according to a certain FEC encoding technique.

According to a first aspect of the present disclosure, in a communications system using a HARQ error control mechanism, in which a transmitter establishes a plurality of HARQ channels with a receiver, the receiver comprising HARQ memory for storing encoded HARQ packets, HARQ reception processor for receiving at least one HARQ burst through each of said plurality of HARQ channels, for converting each of said received HARQ bursts into a received encoded HARQ packet, for combining encoded HARQ packets, and for retrieving or storing encoded HARQ packets from or in said HARQ memory, FEC decoder for decoding each of said encoded HARQ packets stored in the HARQ memory as they are provided by said HARQ reception processor, and for generating FEC decoding status information indicating whether each of said encoded HARQ packets is successfully decoded;

a method for memory management comprises determining whether each of said received encoded HARQ packets needs to be combined with an encoded HARQ packet already stored in said HARQ memory, and in case a received encoded HARQ packet does not need to be combined, determining whether there is a free memory space available in said HARQ memory for storing said received encoded HARQ packet, and if so, allocating said free memory space for storage of said received encoded HARQ packet; and, in case there is not a free memory space available in said HARQ memory for storing said received encoded HARQ packet: determining whether a certain amount of memory space can be forced to be freed, and if so, de-allocating said determined certain amount of memory space and allocating it for storage of said received encoded HARQ packet; before said received encoded HARQ packet is sent to the FEC decoder.

According to another aspect of the disclosure, the step of determining whether a certain amount of memory space can be forced to be freed comprises determining a priority indication for said received encoded HARQ packet and for the encoded HARQ packets stored in the HARQ memory, and determining an amount of memory space comprising encoded HARQ packets which have a priority indication lower than the one determined for the received encoded HARQ packet, and determining a certain amount of said memory space which, when forced to be freed, provides a memory space for storing said received encoded HARQ packet.

According to an illustrative example, the steps of de-allocating the determined amount of memory space and allocating it for storage of the received encoded HARQ packet, comprise de-assigning the memory space assigned to at least one encoded HARQ packet and assigning said memory space to the received encoded HARQ packet, respectively.

According to still another illustrative example, the step of de-allocating the determined amount of memory space comprises the step of compressing at least one encoded HARQ packet stored in said amount of memory space, and the step of allocating said amount of memory space for storage of said received encoded HARQ packet comprises the step of assigning memory space which has been made free by said compression step to the encoded HARQ packet. For example, according to a specific embodiment, the step of compressing at least one encoded HARQ packet comprises puncturing said at least one encoded HARQ packet according to a certain puncturing pattern.

In another embodiment, the memory space allocated to the received encoded HARQ packet is a memory space for storing said received encoded HARQ packet in compressed form.

According to another specific embodiment, the method for memory management further comprises, in case a received encoded HARQ packet needs to be combined with an encoded HARQ packet already stored in a memory location: obtaining a combined encoded HARQ packet by combining said received encoded HARQ packet with said stored encoded HARQ packet, and storing said combined encoded HARQ packet in the same memory location.

In still another embodiment, the memory management method comprises determining whether an stored encoded HARQ packet is stored in compressed form, and if so, expanding said stored encoded HARQ packet before combining.

According to another exemplary implementation, the memory management method further comprises determining whether there is free memory space available for storing the combined encoded HARQ packet in expanded form and, in case no such free memory space is available, storing the combined encoded HARQ packet in compressed form.

Also, compression and expansion may be done according to a certain puncturing pattern.

In another embodiment, the step of determining a priority indication for the received encoded HARQ packet and for the encoded HARQ packets stored in the HARQ memory comprises determining an index of retransmission, and/or a quality indication, and/or an amount of transmission power spent associated to said received encoded HARQ packet and said encoded HARQ packets stored in memory. For example, according to a specific embodiment, the priority indication may be an index of retransmission and a higher index of retransmission indicates a higher priority.

The disclosure further considers an electronic system product that comprises the elements for, at the HARQ receiver side, implementing the method according to an example of the disclosure. Said electronic system product may be comprised in a receiver system and is used in a communications network.

The disclosure and claims will be better understood and further advantages will become apparent from the following description of illustrative embodiments.

BRIEF DESCRIPTION OF THE DRAWINGS

FIG. 4 shows an overview of a HARQ packet transformation, both at the transmitter and the receiver side, according to three HARQ protocol examples.

DETAILED DESCRIPTION OF ILLUSTRATIVE EMBODIMENTS

Figure 1:
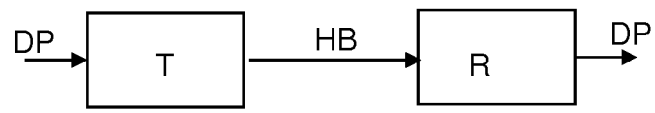
FIG. 1 is a general schematic view of a conventional packet data communications system using a HARQ error detection and correction mechanism.

FIG. 1 shows a general schematic view of a conventional packet data communications system in which a plurality of data packets DP are provided to a transmitter system T which converts said data packets into HARQ bursts HB and transmits HARQ data bursts, through a communication channel, to a receiver system R, which basically converts said received HARQ bursts HB back into the plurality of originally transmitted data packets DP.

The packet data communications system uses a HARQ communications protocol in order to improve transmission reliability over the communication channel. HARQ provides time diversity and also combining gain or coding gain, useful in conditions where the communication channel and/or the interference powers fluctuate. It is also used to mitigate link adaptation errors, and, due to the acknowledgment mechanism, the increased gain is used efficiently (only when needed).

The HARQ protocol scheme used by the packet data communications system can be any of the conventionally used schemes, such as stop-and-wait, go-back-N and selective repeat ARQ, along with a variety of FEC codes.

Figure 2:
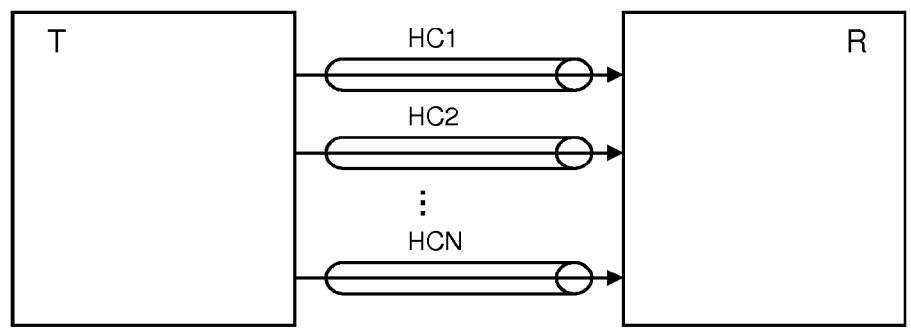
FIG. 2 shows a general schematic view of a conventional packet data communications system in which a transmitter establishes a plurality of HARQ channel connections with a receiver system according to an illustrative embodiment.

FIG. 2 shows a general schematic view of a packet data communications system in which a transmitter T establishes a plurality of parallel HARQ channels HC1 to HCN with a receiver system R through a single data connection. Each HARQ channel is considered an independent HARQ process, in which each HARQ process is in charge of the transmission/reception of one HARQ packet at a given time. This is usually done to improve the transmission throughput, since while a certain HARQ process is waiting for an acknowledgement indication, the other HARQ processes can make use of the communication channel to send more data. An example of such a system could be a WIMAX or UMTS system using a HARQ scheme supporting a N-channel stop-and-wait ARQ, although the disclosure is not limited only to such implementations, as it may be applicable to any type of HARQ system.

Due to the fact that N HARQ channels HC1 to HCN are established in parallel with the receiver and given that each HARQ connection process deals with a single HARQ packet at any given time, i.e. after a certain HARQ burst has been transmitted through a HARQ channel, a new HARQ burst (corresponding to the same HARQ packet) is transmitted as long as the HARQ packet is unsuccessfully decoded at the receiver, it will become evident that the receiver's memory shall have a maximum space to store N HARQ bursts at any given time.

As already indicated, a space of N HARQ data bursts is considered the worst case scenario, and there are HARQ receiver systems which dimension the memory below N based on statistical calculations, considering the frequency of occurrence of the need for storing one HARQ burst for each HARQ channel at the same time, that is, the probability that, at any given time, a HARQ burst of each HARQ channel needs to be stored in memory. In such systems, a certain amount of HARQ data loss is accepted at the receiver side, that is, certain data received may not be stored in memory and used later for combining purposes.

The method and system according to an example of the disclosure provides an innovative memory management method at the receiver side in which a plurality of HARQ channels share a memory space which is dimensioned below the maximum memory space needed to avoid HARQ data loss.

Figure 3:
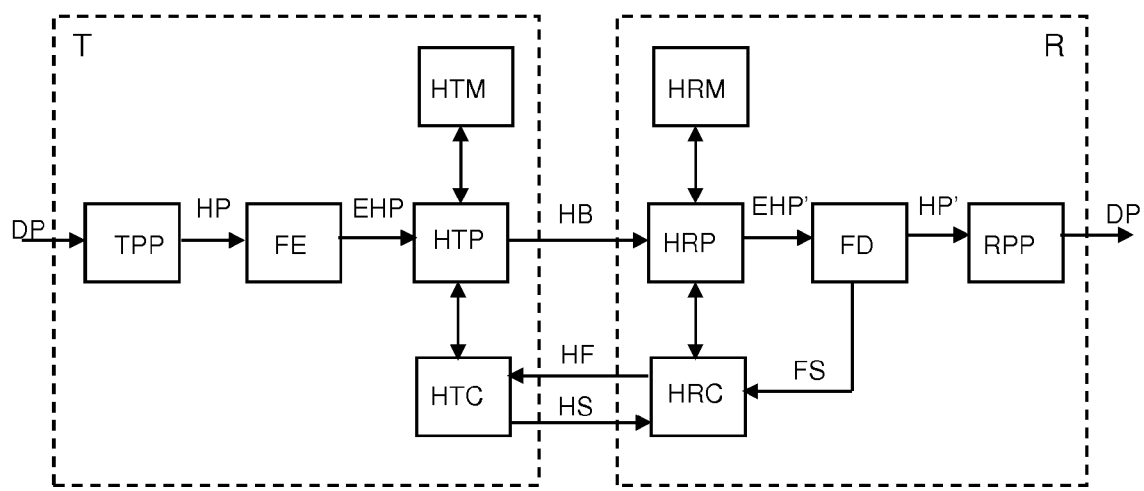
FIG. 3 shows a general implementation of a transmitter and a receiver system using a HARQ error detection and correction mechanism.

FIG. 3 shows a detailed view of the main modules of a transmitter T and a receiver R of a conventional packet data communications system as the one illustrated in FIG. 1. The transmitter T comprises a transmission packet processing module TPP providing HARQ packets HP, a FEC encoder module FE providing encoded HARQ packets EHP, a HARQ transmission processing module HTP, a HARQ transmission memory module HTM and a HARQ transmission control module HTC. The receiver R comprises a HARQ reception memory module HRM, a HARQ reception control module HRC, a HARQ reception processing module HRP providing encoded HARQ packets EHP', a FEC decoder module FD providing HARQ packets HP' and a reception packet processing module RPP. The transmitter T sends a number of HARQ data bursts HB through a plurality of HARQ channel connections and HARQ signaling HS information to the receiver R and the receiver R sends HARQ feedback information HF to the transmitter T. The FEC decoder module FD also provides status information FS to the HARQ reception control module HRC.

At the transmitter T, data packets DP which shall be transmitted are first processed in the transmission packet processing module TPP, e.g. for encryption and fragmentation, which translates said data packets into HARQ packets HP that are to be sent using HARQ protocol. The HARQ packets HP are then encoded in the FEC encoder module FE to increase the robustness against channel impairments. If the code used has no error detection properties, an error detection code is applied before FEC encoding, e.g. a CRC or parity bit, in order to enable the receiver to detect when a HARQ packet has been successfully decoded. The HARQ transmission control module HTC is fully responsible of controlling the overall HARQ protocol on the transmitter side and for the memory management. The HARQ transmission control module HTC sends HARQ signaling information HS concerning the transmitted HARQ bursts HB to the receiver R via a control channel, and it will receive HARQ feedback information HF, in the form of a positive or negative acknowledge, from the receiver R via a feedback channel. The encoded HARQ packets EHP are then processed by the HARQ transmission processing module HTP, under the management of the HARQ transmission control module HTC. For the first transmission, the HARQ transmission processing module HTP will first store an encoded HARQ packet EHP in the HARQ transmission memory HTM, and it will send, over a communications channel, one HARQ burst HB corresponding to the complete encoded HARQ packet EHP or a part of it. For subsequent transmissions of HARQ bursts HB (corresponding to the same HARQ packet HP), the HARQ transmission processing module HTP loads the same or different parts of the encoded HARQ packet EHP and sends the resulting HARQ data burst HB over the communications channel.

At the receiver R, the HARQ reception control module HRC is fully responsible for controlling the overall HARQ protocol corresponding to the receiver side and for the receiving memory management. The HARQ reception control module HRC receives HARQ signaling information HS, via the control channel, about the transmitted HARQ bursts HB from the transmitter T and sends HARQ feedback information HF, based on a FEC decoder module status FS, via a feedback channel. Each HARQ data burst HB received through the communications channel is processed by the HARQ reception processing module HRP under the control of the HARQ reception control module HRC. The HARQ reception processing module HRP is configured for converting the received HARQ burst into an encoded HARQ packet format (in the following referred to as received encoded HARQ packet) with the aid of HARQ signaling information HS, for carrying out HARQ combining and for storing said received encoded HARQ packet, or a combination of said received encoded HARQ packet with another stored encoded HARQ packet, in the HARQ reception memory HRM.

If no combining is necessary, e.g. in case of a first transmission of a HARQ burst corresponding to a certain HARQ packet HP, the HARQ reception processing module HRP provides to the FEC decoder module FD an encoded HARQ packet EHP', which is the received encoded HARQ packet. On the other hand, in case data combining is necessary, that is, in case an encoded HARQ packet EHP' (corresponding to the same HARQ packet) is already stored in memory, then the HARQ reception processing module HRP provides to the FEC decoder module FD an encoded HARQ packet EHP', which is the result of combining the received encoded HARQ packet with the stored encoded HARQ packet.

The FEC decoder module FD is used to obtain HARQ packets HP' from the provided encoded HARQ packets EHP', and by an error detection code, it determines if the resulting HARQ packet HP' has been successfully decoded or not. When a certain HARQ packet HP' does not contain errors after the FEC decoding stage, it will be considered that said HARQ packet has been successfully decoded, and on the contrary, it will be considered that said HARQ packet has been unsuccessfully decoded.

The FEC decoding status information FS is sent to the HARQ reception control module HRC to indicate the successful or unsuccessful decoding event. In case a HARQ packet HP' is successfully decoded, it is provided to the reception packet processing module RPP which does the operations opposite to the transmission packet processing module TPP, e.g. de-fragmentation and decryption, in order to recover the original data packets DP which were given to the transmitter T; or, in case a HARQ packet HP' is unsuccessfully decoded, the HARQ reception control module HRC will send a request (through the HARQ feedback channel HF) to the transmitter T so that a new HARQ burst HB corresponding to the same HARQ packet HP is transmitted.

Generally, transmissions of HARQ bursts HB corresponding to a certain HARQ packet HP are terminated when the FEC decoder result coincides with said HARQ packet HP, or when a certain amount of retransmissions is reached.

The module structure shown in FIG. 3 shall be understood as an example and it will be evident that the functions described can be integrated in fewer modules and/or the modules can be given different names. The receiver system R of FIG. 3 may be comprised, for example, on a mobile station such as a cellular phone.

FIG. 4 shows an example of how the HARQ packets undergo transformation, under HARQ protocol, at the transmitter T and the receiver R of FIG. 3. In particular, FIG. 4 A shows one exemplary transformation of HARQ packets under a HARQ protocol using incremental redundancy (IR) and in which all transmissions are self decodable, FIG. 4 B shows one exemplary transformation of HARQ packets under a HARQ protocol using incremental redundancy (IR) but in which not all transmissions are self decodable, and FIG. 4 C shows one exemplary transformation of HARQ packets under a HARQ protocol using Chase combining (CC) techniques. I shall be understood that the examples shown in FIGS. 4 A, B and C are not exhaustive and are described for better understanding of known HARQ error control mechanisms, see for example sections 6.3.17 and 8.4.9.2 of the IEEE Std 802.16e™-2005 and IEEE Std 802.16T-2004/Corl-2005 (Amendment and Corrigendum to IEEE Std 802.16-2004), dated 28 Feb. 2006.

Section H1 of FIG. 4 shows three HARQ packets 11 to 13 which could be any of the packets HP provided to the FEC encoder module FE of FIG. 3.

Section H2 of FIG. 4 shows three encoded HARQ packets 14 to 16, which could be any of the packets EHP provided by the FEC encoder module FE to the HARQ transmission processing module HTP of FIG. 3. For illustrative purposes, it is considered that the FEC encoder module FE encodes the HARQ packets 11 to 13 at a rate of ¼ when using IR HARQ (FIGS. 4 A and B) and at a rate of ½ when using CC HARQ (FIG. 4 C), and therefore, for IR HARQ, the encoded HARQ packet 14, 15 comprises four parts or sub-packets A, B, C and D as result of FEC encoding, and for CC HARQ, the encoded HARQ packet 16 comprises two parts or sub-packets A, B as result of FEC encoding.

Sections H3 to H7 of FIG. 4 will be described, for simplification, for a HARQ system using incremental redundancy (IR) and in which all transmissions are self decodable (FIG. 4 A), but the principles explained are well known and could be applied for a person skilled in the art to the other two types of HARQ protocols shown in FIGS. 4 B and C. Also for illustrative purposes, it will be considered that four HARQ burst transmissions are needed before successful decoding of the HARQ packet 11.

Section H3 illustrates an exemplary way for the selection of sub-packet sets, which shall be transmitted in the form of HARQ bursts 31 to 34, to a receiver system. The corresponding HARQ data bursts 41 to 44 received at the receiver side are shown in section H4. A first sub-packet set comprising sub-packets A and B is selected for the first HARQ burst transmission of the encoded packet 14. At the receiver side, said first transmitted HARQ burst 31 is received in the form of a first HARQ burst 41, in which the two sub-packets A1, B1 correspond to the transmitted sub-packets A, B with possibly some impairments introduced by the communications channel. If further transmissions, or retransmission, of the same HARQ packet 11, and corresponding encoded HARQ packet 14, are needed, then further HARQ bursts 32 to 34 are generated for transmission. HARQ burst 32, corresponds to a second transmission of HARQ packet 11 and corresponding encoded HARQ packet 14, HARQ burst 33 corresponds to a third transmission of HARQ packet 11 and corresponding encoded HARQ packet 14, and HARQ burst 34 corresponds to a fourth transmission of HARQ packet 11 and corresponding encoded HARQ packet 14. In the example of FIG. 4 A we see that each time a transmission of the same HARQ packet 11 is needed, a set of two sub-packets A, B, C, D, is selected each time, thus sending just part of the encoded HARQ packet 14 in each transmission.

Section H5 shows encoded HARQ packets 51 to 54 which correspond to HARQ bursts 41 to 44 received by the HARQ reception processing module HRP of FIG. 3, i.e., the HARQ reception processing module HRP converts each received HARQ data burst 41 to 44 into an encoded HARQ packet 51 to 54. For the first HARQ data burst received 41, the HARQ reception processing module HRP converts said first HARQ data burst into a first encoded HARQ packet 51, containing the two sub-packets A1, B1 of the first HARQ burst 41 and logical zeros for the other two sub-packets not received. As already indicated in FIG. 3, the receiver system R receives, via a control channel, HARQ signaling information HS concerning the transmitted HARQ bursts HB from the transmitter T, that is, for each HARQ burst transmitted, information will be given to the receiver about the contents of said HARQ burst. With this information, the HARQ reception processing module HRP is able to convert each HARQ burst received 41 to 44 into a corresponding encoded HARQ packet 51 to 54, that is, the HARQ reception processing module HRP converts the second received HARQ burst 42 into encoded HARQ packet 52, the third received HARQ burst 43 into encoded HARQ packet 53, and the fourth received HARQ burst 44 into encoded HARQ packet 54.

After conversion of any one of the received HARQ burst 41 to 44 into an encoded HARQ packet 51 to 54, the HARQ reception processing module HRP checks (or receives information) whether there is a need to combine said encoded HARQ packet 51 to 54, which corresponds to a HARQ burst received 41 to 44, with another encoded HARQ packet stored in the HARQ reception memory HRM. As is known in the art, encoded HARQ packet combination is done, if there is another encoded HARQ packet stored in the HARQ reception memory HRM which corresponds to the same HARQ packet 11 transmitted. The method for determining whether HARQ combining of a certain encoded HARQ packet, with another encoded HARQ packet stored in the HARQ reception memory HRM, is needed, is generally known by the person skilled in the art. For example, in case of an encoded HARQ packet 51, which corresponds to the first transmission of a certain HARQ packet 11, there will be no need for HARQ combining.

In section H6 it is shown the encoded HARQ packets 61 to 64 which are provided by the HARQ reception processing module HRP to the FEC decoder module FD of FIG. 3. Encoded HARQ packet 61 corresponds directly to the encoded HARQ packet 51 converted from the first HARQ burst received 41, since no HARQ combining shall be done. When providing the encoded HARQ packet 61 to the FEC decoder module FD, said encoded HARQ packet 61 is also stored in the HARQ memory HRM, to be potentially used for combining purposes. When a second HARQ burst 42 is received, the HARQ reception processing module HRP converts the received HARQ burst 42 into a received encoded HARQ packet 52 and checks (or receives information) whether said received encoded HARQ packet 52 needs to be combined with a previously stored encoded HARQ packet (corresponding to the same HARQ packet 11). Since this condition is met, that is, encoded HARQ packet 61, corresponding to the same HARQ packet 11, has been already stored in HARQ memory, then the HARQ reception processing module HRP generates encoded HARQ packet 62 as the HARQ combining of said received encoded HARQ packet 52 with said previously stored encoded HARQ packet 61. Again, when providing the encoded HARQ packet 62 to the FEC decoder module FD, the HARQ reception processing module HRP also stores said encoded HARQ packet in the HARQ memory HRM, typically in the same memory space allocated to the previous stored encoded HARQ packet 61. In a similar manner, for subsequent transmissions of HARQ bursts 43, 44, encoded HARQ packet 63 corresponds to the HARQ combining of encoded HARQ packet 53 and the previously stored encoded HARQ packet 62; and encoded HARQ encoded 64 corresponds to the HARQ combining of encoded HARQ packet 54 and the previously stored encoded HARQ packet 63.

Section H7 of FIG. 4 shows HARQ packets 71 to 74 obtained as FEC decoding results for the corresponding encoded HARQ packet input 61 to 64. HARQ packet 71 is the result of FEC decoding encoded HARQ packet 61, HARQ packet 72 is the result of FEC decoding encoded HARQ packet 62, HARQ packet 73 is the result of FEC decoding encoded HARQ packet 63, and HARQ packet 74 is the result of FEC decoding encoded HARQ packet 64. Once the FEC decoder obtains a decoded HARQ packet 71 to 74, it provides the decoding result (successfully or unsuccessfully decoding event) to the HARQ reception control module HRC, which, among other things, will inform the transmitter system T. Each time a HARQ packet 71 to 73 is unsuccessfully decoded, the transmitter system T will transmit a new HARQ burst 32 to 34 corresponding the same HARQ packet 11.

For storage of HARQ data information received, the receiver system R may store the received sub-packets A1, B1, C1 and/or D1 and/or combinations of said sub-packets A1+A2, B1+B3, C2+C4 and/or D3+D4 in the form of log likelihood ratios and in any place in the HARQ reception memory HRM. It is also noted that for storing an encoded HARQ packet 61 to 64 in memory it is not needed to store the logical zeros created by the HARQ reception processing module HRP and provided to the FEC decoder module FD. Additionally, as is the case in FIG. 4C, there is the possibility that the received HARQ bursts (section H4) and received encoded HARQ packets (section H5) are the same for storage purposes.

Figure 5:
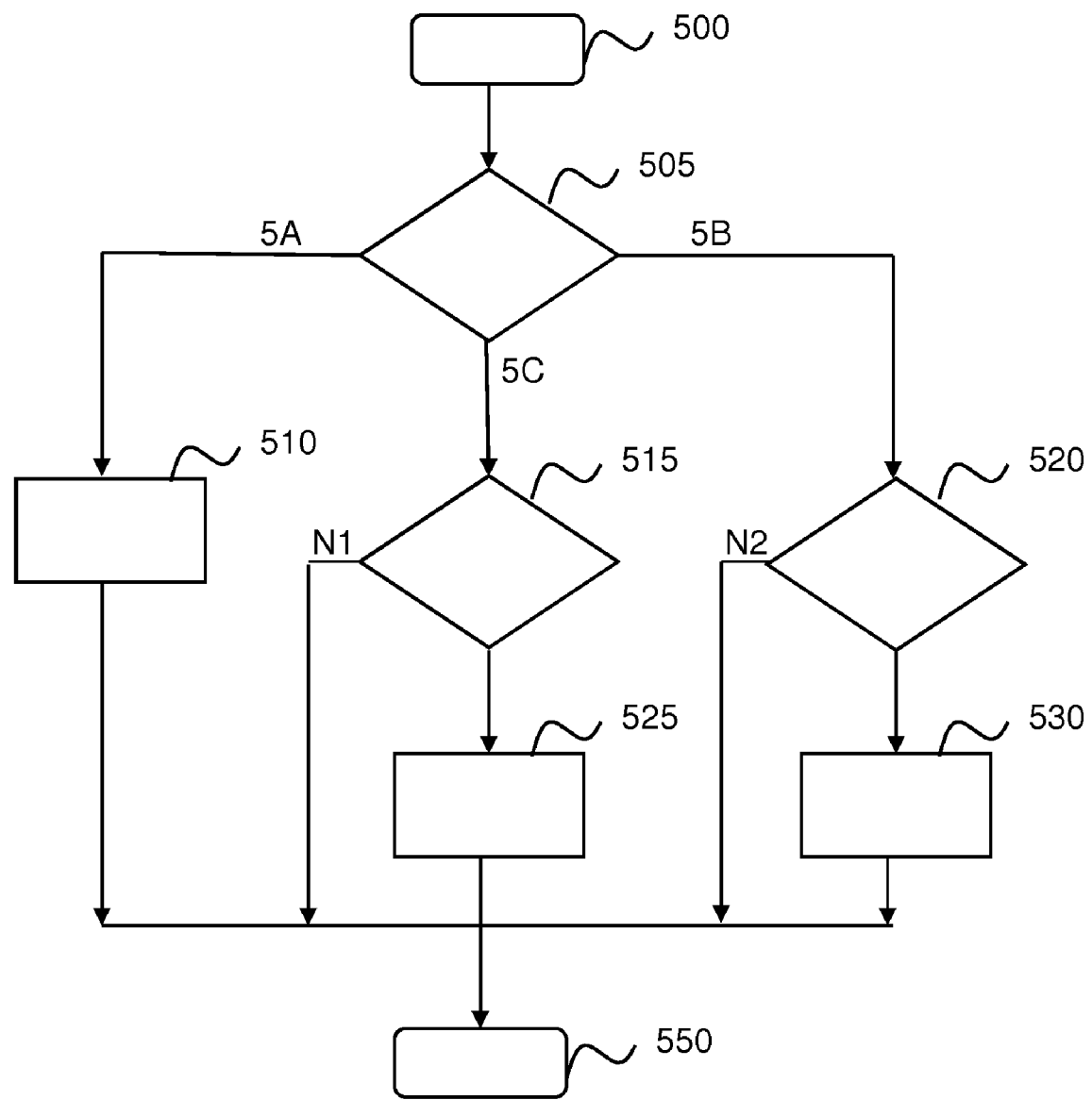
FIG. 5 is a general exemplary flowchart of a memory management method according to an illustrative embodiment of the invention.

FIG. 5 shows a general exemplary flowchart of a memory management method according to an illustrative embodiment. The method starts in step 500, in which an event is detected in the receiver system. The event is analyzed in step 505 and, depending on the kind of event detected, the procedure will follow three different paths 5A, 5B or 5C:

in case the detected event is an event corresponding to the reception of a HARQ burst (for example, any one of HARQ bursts 41 to 44 of FIG. 4A), the procedure follows path 5A and continues with step 510 in which a memory space is allocated for the data contained in said received HARQ burst. After memory allocation is finished, the procedure of path 5A finishes in step 550;

in case the detected event is an event corresponding to the status of the FEC decoder being provided, that is, when the FEC decoder provides an indication (for example, FEC status information FS of FIG. 3) about a determined HARQ packet (for example, HARQ packets 71 to 74 of FIG. 4A) being successfully or unsuccessfully decoded, the procedure follows path 5B and continues with step 520 in which the status of the FEC decoder is analyzed. In case a HARQ packet has been successfully decoded (for example, decoded HARQ packet 74 of FIG. 4A, which corresponds to transmitted HARQ packet 11), the procedure follows with step 530 in which any memory space occupied by an stored encoded HARQ packet, corresponding to said HARQ packet (for example, encoded HARQ packet 64 of FIG. 4A, which corresponds to transmitted HARQ packet 11 and decoded HARQ packet 74), is freed. After the corresponding memory space has been freed, in step 530, the procedure of path 5B finishes in step 550. Alternatively, in case in step 520 it is determined that a HARQ packet has been unsuccessfully decoded (for example, any one of HARQ packets 71 to 73 of FIG. 4A), the procedure of path 5B follows sub path N2 and finishes in step 550 without freeing any memory space; or in case the detected event is an event corresponding to an encoded HARQ packet (for example, any one of encoded HARQ packets 61 to 64 of FIG. 4A) being provided to a FEC decoder, the procedure follows path 5C and continues with step 515 in which it is determined whether the HARQ burst received corresponds to the last transmission for a certain HARQ packet (usually indicated by an index of retransmission). In case the received HARQ burst corresponds to the last transmission, the procedure follows with step 525 in which any memory space occupied by any encoded HARQ packet stored in memory and corresponding to the same HARQ packet, is freed. After the corresponding memory space has been freed, in step 525, the procedure of path 5C finishes in step 550. Alternatively, in case in step 515 it is determined that the HARQ burst does not correspond to the last transmission for a certain HARQ packet, the procedure of path 5C follows sub path N1 and finishes in step 550 without freeing any memory space.

The memory may be managed using pointers or similar means. It shall be noted that freeing memory space, as indicated above in steps 525 and 530, can be carried out either by deleting the content stored in a certain memory space or designating that said memory space is available for storage of new data or free for writing data, e.g. de-assigning the pointers assigned to a certain encoded HARQ packet.

It shall be noted that the process of path 5A starts when the reception of a HARQ burst (for example, any one of received HARQ bursts 41 to 44 of FIG. 4A) is detected (steps 500 and 505) and the process ends (step 550) before an encoded HARQ packet (for example, any one of encoded HARQ packets 61 to 64 of FIG. 4A), is sent to the FEC decoder.

The process of path 5C starts when an encoded HARQ packet is provided to an FEC decoder (for example, when encoded HARQ packets 61 to 64 of FIG. 4A are provided by the HARQ reception processing module HRP to the FEC decoder, for decoding purposes) and ends (step 550) before the FEC decoder provides an indication about a determined HARQ packet (for example, decoded HARQ packets 71 to 74 in FIG. 4A), obtained from said provided encoded HARQ packet, being successfully or unsuccessfully decoded. The process of path 5C is then faster than waiting for the decoding status information from the FEC decoder, since it can free memory as soon as the encoded HARQ packet is sent to the FEC decoder.

The flow chart shown in FIG. 5 shall be understood as an exemplary embodiment, illustrated just for understanding purposes. The memory management method shall not be understood as necessarily comprising all the paths and steps shown in FIG. 5. Each procedure path 5A, 5B or 5C shall be considered independent and which could be applied individually or in combination in a HARQ receiver system; for example, path 5A can be implemented individually in one embodiment of the disclosure; paths 5A and 5B can be implemented in another embodiment; or paths 5A and 5C can be implemented in still another embodiment.

Figure 6:
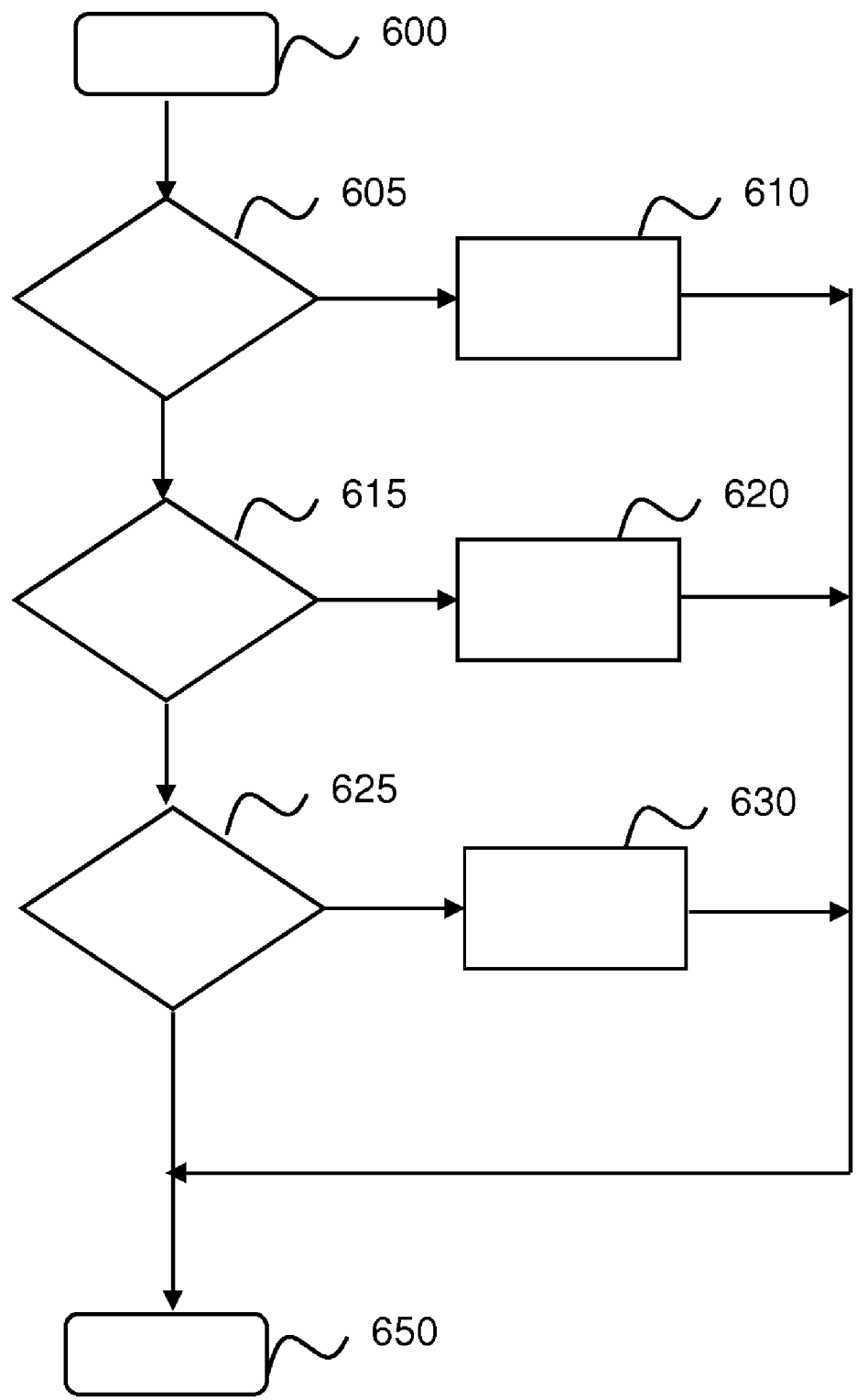
FIG. 6 is a first exemplary memory allocation process flowchart of a memory management method according to an illustrative embodiment.

FIG. 6 shows a first exemplary memory allocation process flowchart, corresponding to step 510 of FIG. 5, of a memory management method according to an exemplary embodiment.

The process starts in step 600 in which information about a certain HARQ burst (e.g. any one of HARQ bursts 41 to 44 of FIG. 4) is received. After step 600, the process follows with step 605 in which it is determined whether an encoded HARQ packet, corresponding to the same HARQ packet transmitted (e.g. any one of encoded HARQ packets 61 to 64 of FIG. 4A), is already stored in memory (which could be the case, for example, when any one of HARQ bursts 42 to 44 of FIG. 4A is received), and therefore HARQ combining shall be done.

In case it is determined, in said step 605, that HARQ combining needs to be done, the process continues with step 610, in which the received encoded HARQ packet (e.g. any one of encoded HARQ packets 52 to 54 of FIG. 4A result of converting the received HARQ burst into encoded HARQ format) is allocated to the same memory space as the one occupied by the stored encoded HARQ packet (i.e. the same memory space used for storing any one of encoded HARQ packets 61 to 63 of FIG. 4A). After step 610 the memory allocation process ends with step 650.

Conversely, in case in said step 605 it is determined that no HARQ combining needs to be done (e.g. when HARQ burst 41 of FIG. 4A is received), then the process follows with step 615, in which it is determined whether there is a free memory space available for storing a received encoded HARQ packet (e.g. received encoded HARQ packet 51 of FIG. 4A), result of converting the received HARQ burst into encoded HARQ packet format. In case it is determined, in said step 615, that there is free memory space available for storing said received encoded HARQ packet, the process follows with step 620, in which a determined free memory space is allocated, to said received encoded HARQ packet, for memory storage purposes. After step 620, the memory allocation process ends with step 650.

When the condition of step 615 is not met, that is, if it is determined that no free memory space is available for storing said received encoded HARQ packet (e.g. received encoded HARQ packet 51 of FIG. 4A), then the process follows with step 625, in which it is determined whether a certain amount of memory space can be forced to be freed in order to store said received encoded HARQ packet in memory. In case said certain amount of memory space can be forced to be freed, as determined in said step 625, the process then follows with step 630, in which said determined amount of memory space is de-allocated and said forcefully freed memory space is allocated, to said received encoded HARQ packet, for memory storage purposes. After step 630, the memory allocation process ends with step 650.

When the condition of step 625 is not met, that is, if it is determined that said certain amount of memory space cannot be forced to be freed, then the memory allocation process ends with step 650, and, in that case, no allocation of memory space will be carried for a certain received encoded HARQ packet and consequently it will not be stored in the receiver's memory.

It will become evident from the above description that the memory management method advantageously tries to allocate, in the receiver's memory, received encoded HARQ packets corresponding to a certain transmitted HARQ packet for which no memory space is already allocated, that is, when no encoded HARQ packet corresponding to said transmitted HARQ packet is already stored in memory when a HARQ burst is received, or when no HARQ combining needs to be done for a certain received encoded HARQ packet. For example, in case of a first HARQ packet transmission, or a first HARQ burst transmission, no encoded HARQ packet is already stored in memory when said first HARQ burst is received, and therefore, when the HARQ burst is converted into an encoded HARQ packet, said encoded HARQ packet needs to be allocated (and stored) in memory for the first time. No HARQ combining is needed in such case and said encoded HARQ packet is also directly sent to the FEC decoder. As already indicated above, said memory allocation is finished before said encoded HARQ packet is sent to the FEC decoder.

The scenario described in the above paragraph, may not only occur for first transmitted HARQ bursts (e.g. for a first transmitted HARQ burst 31 of FIG. 4A), and this situation, in which memory allocation for a certain encoded HARQ packet needs to be done for the first time, may occur also when a subsequent HARQ burst is transmitted (e.g. transmitted HARQ burst 32 of FIG. 4A) and the encoded HARQ packet corresponding to the first transmission (e.g. encoded HARQ packet 51 or 61 of FIG. 4A) could not be allocated in memory for any reason. In such cases, in which no encoded HARQ packet corresponding to previous HARQ burst transmissions could be stored in memory, a memory allocation for a certain encoded HARQ shall be done for the first time in the advantageous way indicated by the disclosure.

It shall be noted that the memory allocation process described above may be implemented in the same or a different receiver's module than the one actually carrying HARQ combining and HARQ memory access. For example, the memory allocation process according to any embodiment be implemented, making reference to the receiver system R of FIG. 3, in the HARQ reception control module HRC and HARQ combining and HARQ memory access may be carried by the HARQ reception processing module HRP. The memory allocation process according to any embodiment may be used to control or provide information to the HARQ reception processing module HRP for HARQ combining and/or storage of the HARQ combining result in HARQ memory.

According to the method of an exemplary embodiment, received HARQ encoded packets which can be combined are allocated to the same memory space already allocated to the encoded HARQ packets stored in memory, and for received encoded HARQ packets which need not be combined, it is first determined if a free memory space is available for allocation. In case there is no free memory space available in the HARQ memory that can be allocated to that received encoded HARQ packet, then it is determined, in step 625 if a certain amount of memory space can be forced to be freed in order to store said encoded HARQ packet. To force any memory space to be freed shall be understood as a way to allocate a memory space to an encoded HARQ packet which is, at a given time, occupied by another encoded HARQ packet. According to an embodiment of the disclosure, the step of determining whether a certain amount of memory space can be forced to be freed, in step 625, can be implemented as follows:

a) determining a priority indication based on an index of retransmission, a quality indication (for example the CINR), an amount of transmission power spent, or a combination of all or some of the characteristics above associated to encoded HARQ packets stored in memory and to the received encoded HARQ packet that needs to be allocated. In one embodiment, for example, the prioritization criterion used is based on the index of retransmission, where encoded HARQ packets with a higher retransmission index have a higher priority than encoded HARQ packets with lower retransmission index. The retransmission index can be determined by counting the number of transmissions used for a certain HARQ packet; and b) determining an amount of memory space comprising encoded HARQ packets which have a priority indication lower than the one determined for the received encoded HARQ packet, and c) determining a certain amount of said memory space which, when forced to be freed, provides a memory space for storing said received encoded HARQ packet.

If no (or not enough) memory space can be forced to be freed to store the received encoded HARQ packet, then said received encoded HARQ packet does not obtain any memory allocation, and is not stored in the receiver's memory.

According to an illustrative example, at least two techniques can be used for forcing a memory space in the HARQ receiver's memory to be freed: one technique being stealing memory space from stored encoded HARQ packets which belong to other HARQ channels and at least another technique being compressing stored encoded HARQ packets belonging to other HARQ channels.

According to one embodiment using stealing of memory space, the memory allocation process determines at least one memory space occupied by an encoded HARQ packet that has a priority lower than the priority associated with the received encoded HARQ packet that needs to be allocated. Once said memory space is successfully determined, it will be de-allocated, e.g. by de-assigning said memory space from said at least one encoded HARQ packet, and allocated to the received encoded HARQ packet for storage. This technique can be understood as overwriting encoded HARQ packets stored in the HARQ memory that have less priority than the received encoded HARQ packet needs to be allocated.

Figure 7:
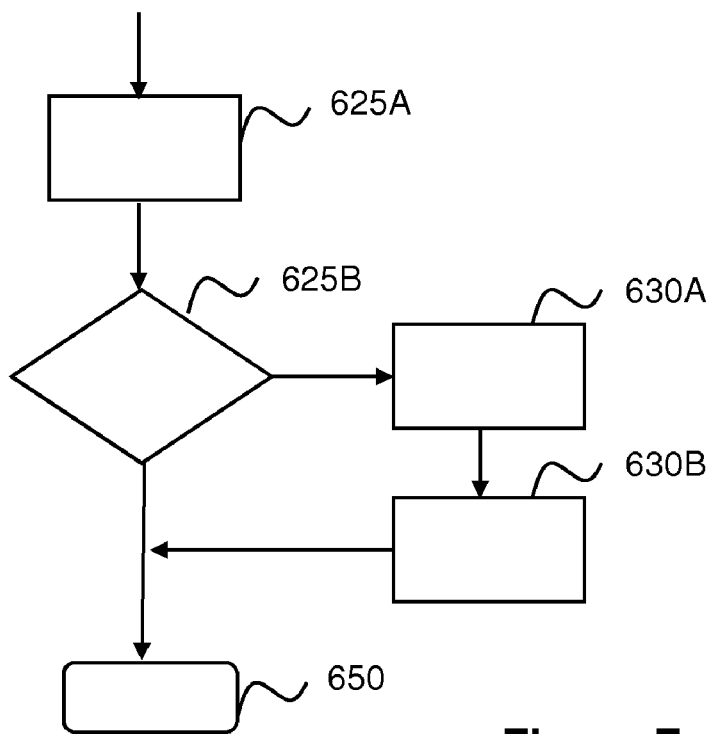
FIG. 7 is a second exemplary memory allocation process flowchart of a memory management method according to an illustrative embodiment.

FIG. 7 shows, a detail flowchart, corresponding to steps 625, 630 and 650 of FIG. 6, of an exemplary memory allocation process using stealing of memory. In step 625A it is determined an amount of memory space occupied by encoded HARQ packets stored in memory which have a priority lower than the priority associated with the received encoded HARQ packet that needs to be allocated. The process follows with step 625B, in which it is evaluated whether an amount of the memory space determined in step 625A is enough for storing the received encoded HARQ packet. In case enough memory space could be determined, the process follows with step 630A, in which a memory space is de-allocated e.g. de-assigned from at least one of the stored encoded HARQ packet, and then, with step 630B, in which the received encoded HARQ packet is allocated to said memory space for storage. Conversely, if the condition of step 625B is not met, that is, not enough memory space could be determined for forcing enough memory space to be freed for storing said received encoded HARQ packet, the process ends in step 650 without allocating any memory space to said received encoded HARQ packet.

According to one embodiment using compression of stored encoded HARQ packets, the process determines a first amount of memory space occupied by encoded HARQ packets stored in memory which have a priority lower than the priority associated with the received encoded HARQ packet that needs to be allocated, and after that, it determines a second amount of memory space that can be made free when compressing the encoded HARQ packets stored in said determined first amount of memory space. Compression, in this context shall be understood as any technique which reduces the amount of data used to represent a certain encoded HARQ packet, for example, reducing the number of bits which indicate a certain log likelihood ratio. When compressing said stored encoded HARQ packets, although a certain amount of combining gain information is lost, a certain amount of memory space is in turn freed while preserving some of the combining gain. When enough memory space can be freed, using compression, for storage of the received encoded HARQ packet, then the encoded HARQ packets stored in said determined first amount of memory space are compressed and the received encoded HARQ packet is allocated to the free space made available after said compression.

According to one embodiment, puncturing of encoded HARQ packets stored in memory is used to achieve the desired compression effect. Puncturing is a technique generally used in the field of data transmission for increasing an encoder's coding rate; see for example, section 17.3.5.5 and FIG. 115 of IEEE Std 802.11a-1999 (R2003) (Supplement to IEEE Std 802.11-1999), Reaffirmed 12 Jun. 2003. Now, according to an example of the disclosure, this technique is applied in the memory allocation process as a means of compression by storing only a part of a stream of data (e.g. an encoded HARQ packet) following a specific pattern that repeats itself, for instance, store M units, discard N units, store O units, discard P units, and the pattern (M, N, O, P) is repeated. Units shall be understood as a basic amount to represent data such as bit, byte, log-likelihood ratio, QAM symbol, etc, As an example, for a 1:2 puncturing ratio, if the unit is a log-likelihood ratio (LLR), out of the 2*K LLRs comprising the data stream, only K LLRs will be kept, by puncturing every other LLR, i.e. keeping only the first, $3^{rd}$, $5^{th}$ LLR and so on. In yet another example, for the same 1:2 puncturing ratio, the unit can be chosen to be half of a data stream where only the first half of the data stream is preserved.

Figure 8:
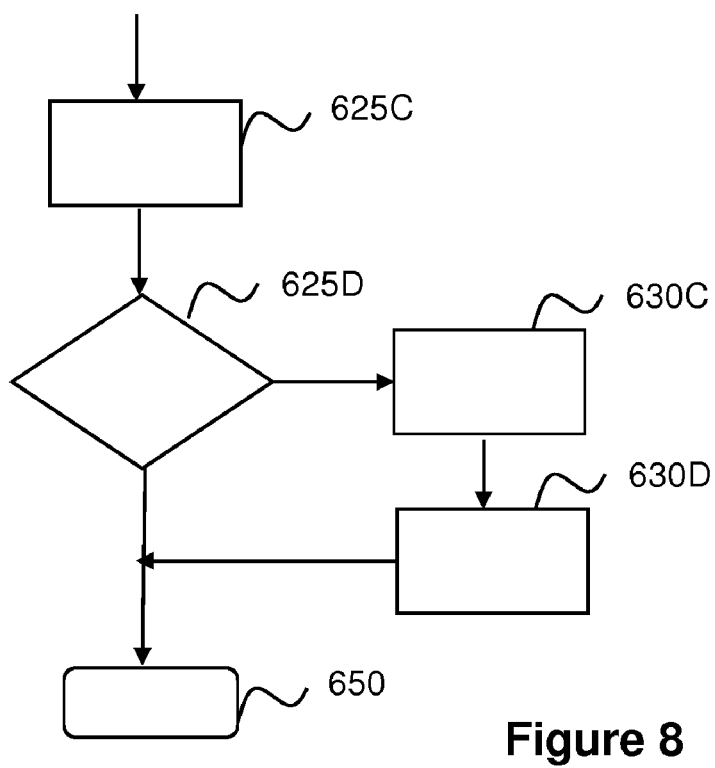
FIG. 8 is a third exemplary memory allocation process flowchart of a memory management method according to an illustrative embodiment.

FIG. 8 shows a detail flowchart, corresponding to steps 625, 630 and 650 of FIG. 6, of an exemplary memory allocation process using puncturing of stored encoded HARQ packets. In step 625C it is determined an amount of memory space occupied by encoded HARQ packets stored in memory which have a priority lower than the priority associated with the received encoded HARQ packet that needs to be allocated. The process follows with step 625D, in which it is evaluated whether an amount of the memory space determined in step 625C, when punctured according to a certain puncturing pattern, will generate enough free space for storing the received encoded HARQ packet. In case enough memory space could be determined, the process follows with step 630C, in which the determined memory space is de-allocated by puncturing the encoded HARQ packets stored in said memory space, and then, with step 630D, in which the received encoded HARQ packet is allocated to said free space made available by puncturing (in step 630C). Conversely, if the condition of step 625D is not met, that is, not enough memory space could be determined for forcing enough memory space to be freed for storing said received encoded HARQ packet, the process ends in step 650 without allocating any memory space to said received encoded HARQ packet.

A memory allocation process using compression, and particularly puncturing, of stored encoded HARQ packets is particularly advantageous since it increases the memory reuse in the receiver and at the same time preserves some of the combining gain, i.e. encoded HARQ packets already stored in memory are not lost, and it is therefore ensured that all stored encoded HARQ packets will be eventually correctly decoded and hence the memory freed. By puncturing encoded HARQ packets stored in memory, said data is maintained in memory in compressed form and, at the same time, some free space is made available for further storing purposes. In one embodiment using puncturing, the puncturing pattern uses a 1:2 coding ratio, so that, when puncturing a certain encoded HARQ packet stored in a certain memory space, one half of the memory space is used for storing said encoded HARQ packet in punctured form and the other half is made free for storing new data. Different puncturing ratios can be also used.

It shall be understood that obvious modifications of the detailed exemplary processes described in FIGS. 7 and 8 for forcing an amount of memory space to be freed, in order to store a received encoded HARQ packet, are also contained in an example of the current invention. For example, it may be first determined an amount of memory space needed to store said certain received encoded HARQ packet, and then look for said specific memory space in memory. It is also possible that the amount of memory space which could be forced to be freed is greater than the memory space needed to store the received encoded HARQ packet, and in that case it is also possible to implement simple mechanisms (e.g. prioritization) to decide which specific memory space will be finally forced to be freed.

The amount of memory space needed to store a certain received encoded HARQ packet, will depend on the form in which said encoded HARQ packet shall be stored in memory, e.g. using QAM symbols or converted to log-likelihood ratios, and whether it shall be stored in full or compressed form, for example, in still another embodiment, the received encoded HARQ packet is compressed (e.g. punctured) before being stored in memory.

Figure 9:
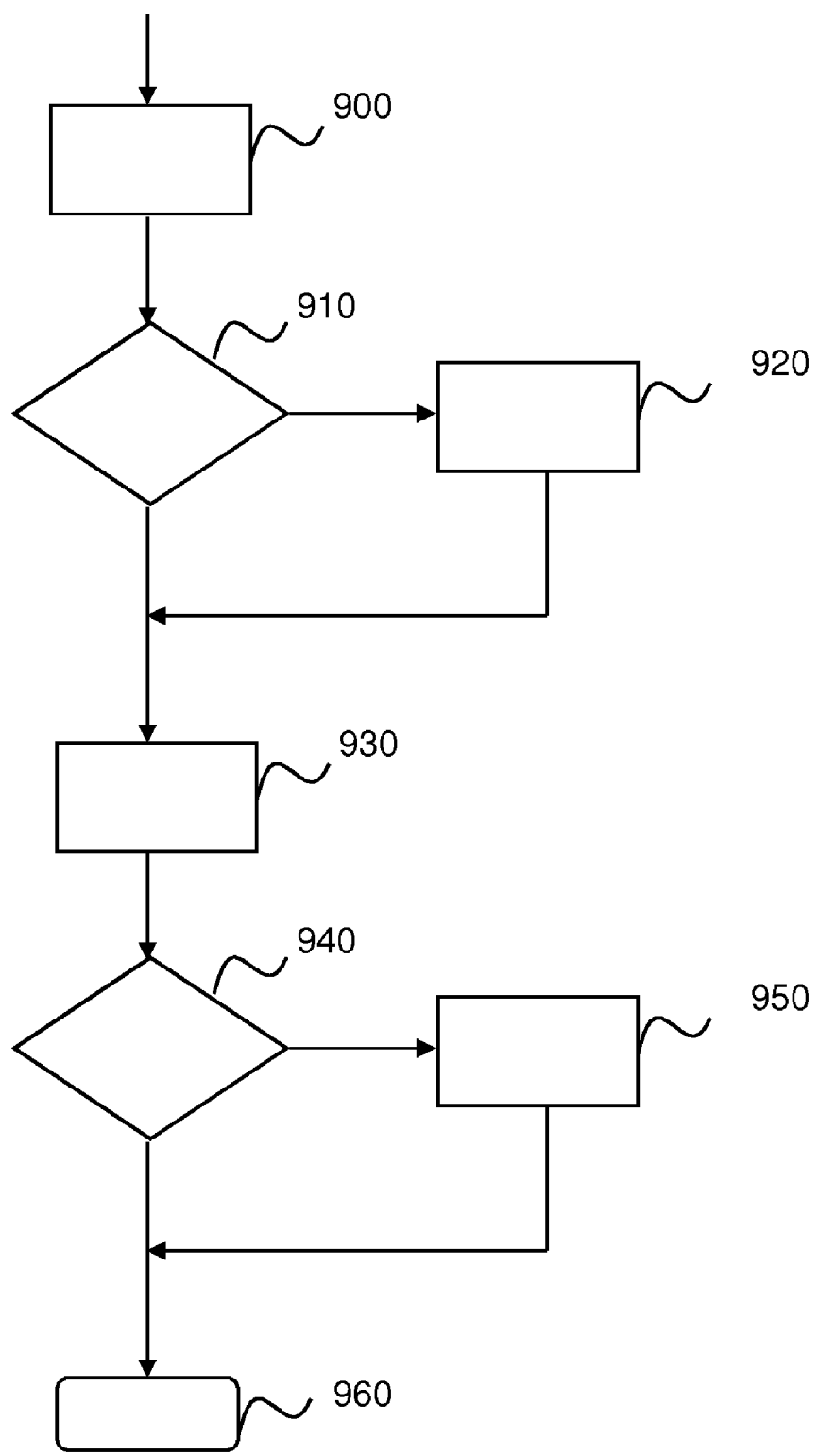
FIG. 9 is a fourth exemplary memory allocation process flowchart of a memory management method according to an illustrative embodiment.

FIG. 9 shows a further detail flowchart, corresponding to step 610 of FIG. 6, of an exemplary memory allocation process using compression (e.g. puncturing) of stored encoded HARQ packets in a receiver system according to a further embodiment. In case any encoded HARQ packets have been compressed, the exemplary embodiment according to FIG. 9 will try to expand (e.g. de-puncture) said encoded HARQ packets when free memory is again available.

As indicated above, in the description of FIG. 6, in case it is determined, in step 605, that a received encoded HARQ packet needs to be combined with a stored encoded HARQ packet, the process continues with the steps shown in FIG. 9. In step 900 the received encoded HARQ packet is allocated to the same memory space as the one occupied by the stored encoded HARQ packet. Then, the process follows with step 910 in which it is determined whether the stored encoded HARQ packet (which shall be combined with the received encoded HARQ packet) has been compressed (e.g. punctured).

In case it is determined, in step 910, that said stored encoded HARQ packet is not compressed, the process follows with step 930, in which conventional HARQ combining of the two encoded HARQ packets will be performed. Conversely, in case it is determined, in step 910, that the stored encoded HARQ packet is compressed, the process follows (before doing HARQ combining in step 930) with step 920, in which said stored encoded HARQ packet is expanded (i.e. de-compressed). For example, if a certain puncturing pattern has been used to compress said encoded HARQ packet, then said encoded HARQ packet will be de-punctured using the same puncturing pattern.

In step 940 it is determined whether there is enough free memory space available for storing the combined encoded HARQ packet (result of combining the received encoded HARQ packet and the stored encoded HARQ packet) in expanded (i.e. complete, not-compressed) form. In case it is determined, in step 940, that there is not enough free memory space to store the combined encoded HARQ packet in expanded form, then the process follows with step 950, in which the combined encoded HARQ packet is compressed again. The memory allocation process ends with step 960.

It will become evident from the description above, that further embodiments are possible in which implementations using stealing of memory and compressing of HARQ data may be combined. For example, an embodiment may use stealing of memory in order to store an encoded HARQ packet in compressed (e.g. punctured) form. Later, when free memory is again available, said compressed data may be expanded and restored in memory.

Additionally, for the sake of completeness, although the memory allocation procedures of FIGS. 6 to 9 have been explained in combination with the memory management method of FIG. 5, it is also possible that said procedures are implemented individually in other stages of the HARQ receiving process, that is, before actual reception of the HARQ data burst or even after the FEC decoding stage. For example, the idea of compressing HARQ data already stored in memory, or storing encoded HARQ packets in compressed form can be applied at any time, without waiting for the HARQ memory to be full.

Figure 10:
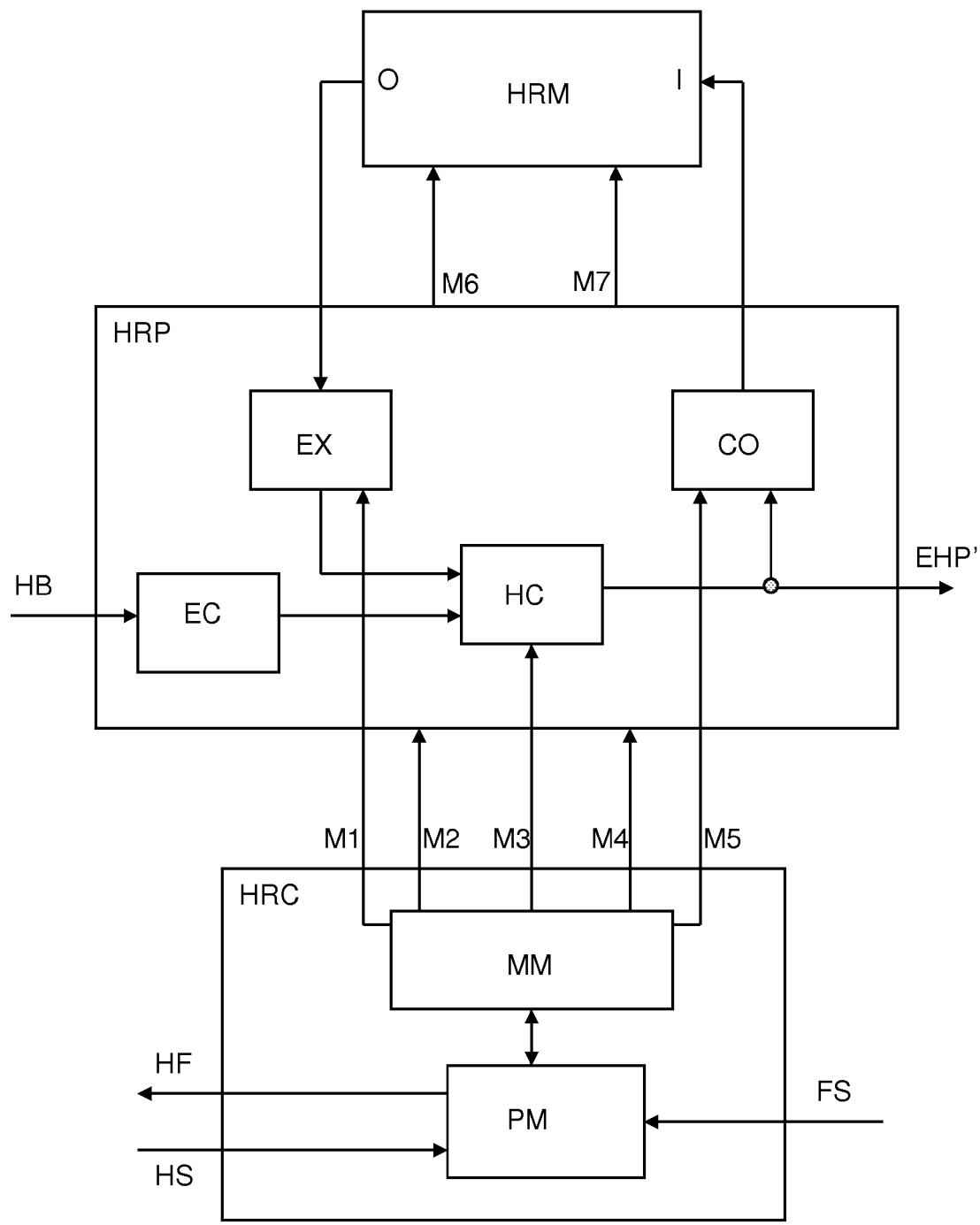
FIG. 10 shows an exemplary detailed implementation of a receiver system using a memory management method according to an illustrative embodiment.

FIG. 10 shows an exemplary detailed implementation of a receiver system according to an illustrative example of the disclosure, comprising a HARQ reception memory HRM, a HARQ reception processing module HRP and a HARQ reception control module HRC in a configuration similar to the one depicted in FIG. 3. In more detail, the HARQ reception processing module HRP comprises a conversion module EC, a HARQ combiner module HC, a compression module CO, an expansion module EX, and two memory access connections M6, M7. The HARQ reception control module HRC comprises a memory management module MM connected to a protocol management module PM. The protocol management module PM receives FEC decoding status information FS and HARQ signaling information HS, and provides HARQ feedback information HF.

The memory management module MM has, at least, one connection M1 to the expansion module EX, two memory control connections M2, M4 to the HARQ reception processing module HRP, one connection M3 to the HARQ combiner module HC, and one connection M5 to the compression module CO. The connections M2 and M4 serve to indicate the HARQ reception processing module HRP which addresses shall be used to access the memory, e.g. so that the content of a certain memory address shall be provided at the output O of the memory or that a certain information present at the input I of the memory shall be stored in a certain address, respectively; said memory control connections M2 and M4 may be used either as physical addresses or as pointers to larger blocks of memory and the HARQ reception processing module HRP will translate those into actual series of physical addresses and convey them to the HARQ reception memory HRM via memory access connections M6 and M7. The connection M5 to the compression module CO serves to indicate to said module whether it shall compress (and eventually the type of compression to be used) an encoded HARQ packet EHP' provided by the HARQ combiner module HC; the connection M1 to the expansion module EX serves to indicate to said module whether it shall expand (and eventually the type of expansion to be used) an encoded HARQ packet provided by the HARQ reception memory HRM; and the connection M3 to the HARQ combiner module HC serves to indicate to said module whether it shall provide, as the output of the module, a combination of an encoded packet provided by the expansion module EX and an encoded HARQ packet provided by the conversion module EC, or just the encoded HARQ packet given by the conversion module EC (when no combining is needed). The conversion module EC is in charge of converting each of the HARQ data bursts received by the HARQ reception processing module HRP into received encoded HARQ packets.

According to an example of the disclosure, the memory management module MM is able to control the process of allocating received encoded HARQ packets (for storing purposes) or retrieve any stored encoded HARQ packet from memory (for combining purposes). The memory management module MM maintains a list of all data (and further characteristics associated to said data) stored in the HARQ reception memory HRM and is able to determine an amount of said data which can be forced to be freed (by stealing memory space from another HARQ channels or by compression of data) when the memory is full. Advantageously, the compression and expand module use puncturing techniques for compressing data and expand said compressed data respectively. In another embodiment, the HARQ reception memory HRM shall not be necessarily full in order for the memory management module MM to start compression/expansion of data, this can even be done systematically, in order to save memory space. It is also possible that the compression and expansion module implement different compression and expansion techniques or modes and that the management module MM indicates to these modules which compression/expansion mode shall be used.

The described embodiments can be implemented in the form of an electronic system product such as a memory, a system on chip (SoC), a system in package (SiP), a field-programmable gate array (FPGA), etc., which contains the essential elements to implement the memory management method illustrated above. Said electronic system product may be comprised or implemented in a receiver or transceiver system, such as a communications terminal, mobile station or a network communications element, and is consequently used in a communications network.

Although the present disclosure has been described with reference to one or more examples, workers skilled in the art will recognize that changes may be made in form and detail without departing from the scope of the disclosure and/or the appended claims.

What is claimed is:

1. A method for memory management in a communications system using a HARQ error control mechanism, in which a transmitter establishes a plurality of HARQ channels with a receiver, the receiver comprising
a HARQ memory for storing encoded HARQ packets,
a HARQ reception processor for receiving at least one HARQ burst through each of said plurality of HARQ channels, for converting each of said received HARQ bursts into a received encoded HARQ packet, for combining encoded HARQ packets, and for retrieving or storing encoded HARQ packets from or in said HARQ memory means,
an FEC decoder for decoding each of said encoded HARQ packets stored in the HARQ memory as they are provided by said HARQ reception processor, and for generating FEC decoding status information indicating whether each of said encoded HARQ packets is successfully decoded;
the method comprising
determining whether each of said received encoded HARQ packets needs to be combined with an encoded HARQ packet already stored in said HARQ memory, and
in case a received encoded HARQ packet does not need to be combined, determining whether there is a free memory space available in said HARQ memory for storing said received encoded HARQ packet, and if so, allocating said free memory space for storage of said received encoded HARQ packet; and,
wherein in case there is not a free memory space available in said HARQ memory for storing said received encoded HARQ packet,
determining whether a certain amount of memory space can be forced to be freed, and if so,
de-allocating said determined certain amount of memory space and allocating it for storage of said received encoded HARQ packet,
before said received encoded HARQ packet is sent to the FEC decoding.

2. The method for memory management according to claim 1, wherein the step of determining whether a certain amount of memory space can be forced to be freed comprises:
determining a priority indication for said received encoded HARQ packet and for the encoded HARQ packets stored in the HARQ memory, and
determining an amount of memory space comprising encoded HARQ packets which have a priority indication lower than the one determined for the received encoded HARQ packet, and
determining a certain amount of said memory space which, when forced to be freed, provides a memory space for storing said received encoded HARQ packet.

3. The method for memory management according to claim 1, wherein the steps of de-allocating said determined amount of memory space and allocating it for storage of said received encoded HARQ packet, comprise de-assigning the memory space assigned to at least one encoded HARQ packet and assigning said memory space to the received encoded HARQ packet, respectively.

4. The method for memory management according to claim 1, wherein the step of de-allocating said determined amount of memory space comprises the step of compressing at least one encoded HARQ packet stored in said amount of memory space, and the step of allocating said amount of memory space for storage of said received encoded HARQ packet comprises the step of assigning memory space which has been made free by said compression step to the encoded HARQ packet.

5. The method for memory management according to claim 4, wherein the step of compressing at least one encoded HARQ packet comprises puncturing said at least one encoded HARQ packet according to a certain puncturing pattern.

6. The method for memory management according to claim 1, wherein the memory space allocated to the received encoded HARQ packet is a memory space for storing said received encoded HARQ packet in compressed form.

7. The method for memory management according to claim 1, further comprising, in case a received encoded HARQ packet needs to be combined with an encoded HARQ packet already stored in a memory location,
obtaining a combined encoded HARQ packet by combining said received encoded HARQ packet with said stored encoded HARQ packet, and
storing said combined encoded HARQ packet in the same memory location.

8. The method for memory management according to claim 1, further comprising, in case a received encoded HARQ packet needs to be combined with an encoded HARQ packet already stored in a memory location,
obtaining a combined encoded HARQ packet by combining said received encoded HARQ packet with said stored encoded HARQ packet, and
storing said combined encoded HARQ packet in the same memory location,
which further comprises determining whether said stored encoded HARQ packet is stored in compressed form, and if so, expanding said stored encoded HARQ packet before combining.

9. The method for memory management according to claim 8, further comprising determining whether there is free memory space available for storing said combined encoded HARQ packet in expanded form and, in case no such free memory space is available, storing the combined encoded HARQ packet in compressed form.

10. The method for memory management according to claim 8, wherein compression and expansion is done according to a certain puncturing pattern.

11. The method for memory management according to claim 2, wherein the step of determining a priority indication for said received encoded HARQ packet and for the encoded HARQ packets stored in the HARQ memory comprises determining an index of retransmission, and/or a quality indication, and/or an amount of transmission power spent associated to said received encoded HARQ packet and said encoded HARQ packets stored in memory.

12. The method for memory management according to claim 2, wherein the step of determining a priority indication for said received encoded HARQ packet and for the encoded HARQ packets stored in the HARQ memory comprises determining an index of retransmission, and/or a quality indication, and/or an amount of transmission power spent associated to said received encoded HARQ packet and said encoded HARQ packets stored in memory,
wherein the priority indication is an index of retransmission and where a higher index of retransmission indicates a higher priority.

13. An electronic system product of a communications system using a HARQ error control mechanism, in which a transmitter establishes a plurality of HARQ channels with a receiver, the electronic system product comprising:
a HARQ memory for storing encoded HARQ packets,
a HARQ reception processor for receiving at least one HARQ burst through each of said plurality of HARQ channels, for converting each of said received HARQ bursts into a received encoded HARQ packet, for combining encoded HARQ packets, and for retrieving or storing encoded HARQ packets from or in said HARQ memory,
a HARQ reception controller for determining whether each of said received encoded HARQ packets needs to be combined with an encoded HARQ packet already stored in memory, and, in case a received encoded HARQ packet does not need to be combined, for determining whether there is a free memory space available in said HARQ memory for storing said received encoded HARQ packet, and if so, for allocating said free memory space for storage of said received encoded HARQ packet; and,
wherein, the HARQ reception controller is further adapted to, in case there is not a free memory space available in said HARQ memory for storing said received encoded HARQ packet,
determine whether a certain amount of memory space can be forced to be freed, and if so,
de-allocate said determined certain amount of memory space an allocate it for storage of said received encoded HARQ packet,
before said received encoded HARQ packet is sent to a FEC decoder.

14. A receiver system comprising an electronic system product according to claim 13.

15. A communications network comprising a receiver system according to claim 14.

* * * * *